(12) United States Patent
Acharya et al.

(10) Patent No.: US 6,759,646 B1
(45) Date of Patent: Jul. 6, 2004

(54) COLOR INTERPOLATION FOR A FOUR COLOR MOSAIC PATTERN

(75) Inventors: Tinku Acharya, Tempe, AZ (US); Edward J. Bawolek, Chandler, AZ (US); Ping-Sing Tsai, Gilbert, AZ (US); John Joseph Bean, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/199,836

(22) Filed: Nov. 24, 1998

(51) Int. Cl.[7] ................................................. H01J 5/16
(52) U.S. Cl. ........................................ 250/226; 348/273
(58) Field of Search ............................... 250/226, 208.1, 250/208.2, 578.1; 358/514, 515; 356/402, 405, 406, 416, 419; 348/270–279; 257/294

(56) References Cited

U.S. PATENT DOCUMENTS 5,631,703 A * 5/1997 Hamilton, Jr. et al. ...... 348/273
5,805,217 A * 9/1998 Lu et al. ..................... 348/273
5,926,238 A * 7/1999 Inoue et al. .................. 349/61

OTHER PUBLICATIONS

Copy of application Ser. No. 08/963,334, by Tinku Acharya, filed Nov. 3, 1997, "A Block–Matching Algorithm For Color Interpolation", 33 pp., 3 drawings.

* cited by examiner

Primary Examiner—Thanh X. Luu
(74) Attorney, Agent, or Firm—Seth Z. Kalson

(57) ABSTRACT

An imager with a four color mosaic pattern of red, green, blue, and infrared pass filters, where color component signals for a pixel are interpolated by averaging over nearest neighbor pixels.

14 Claims, 7 Drawing Sheets

B G R G

G IR G IR

R G B G

G IR G IR

| | | | |
|---|---|---|---|
| B | G | R | G |
| G | IR | G | IR |
| R | G | B | G |
| G | IR | G | IR |

|   | 1 | 2 | 3 | 4 |
|---|---|---|---|---|
| 1 | B | G | R | G |
| 2 | G | IR | G | IR |
| 3 | R | G | B | G |
| 4 | G | IR | G | IR |
| 5 | B | G | R | G |

FIG. 6

| | | | |
|---|---|---|---|
| C | Y | M | Y |
| Y | IR | Y | IR |
| M | Y | C | Y |
| Y | IR | Y | IR |

FIG. 8

COLOR INTERPOLATION FOR A FOUR COLOR MOSAIC PATTERN

FIELD OF INVENTION

The present invention relates to imaging, and more particularly, to a four-color mosaic tiling pattern and color interpolation.

BACKGROUND

A simplified cross sectional view of an imaging system is illustrated in FIG. 1. Optical system 102 focuses electromagnetic radiation onto a focal plane, which may be taken as Color Filter Array (CFA) 104 and pixel sensor array 106. The CFA is usually deposited over pixel sensor array 106 by photo-lithographic techniques well known to the semiconductor industry. Pixel sensor array 106 is an array of pixel sensors, where in general, a pixel sensor is any sensor which absorbs radiation and provides a signal indicative of the absorbed radiation. Pixel sensor array 106 may be, for example, an array of charge coupled devices (CCD), or an integrated array of CMOS (Complementary Metal Oxide Semiconductor) pixel circuits. A pixel circuit may comprise a photo diode, where photons absorbed by the photo diode generate electron-hole pairs, along with additional circuits to provide an electrical signal, either a voltage or current signal, indicative of the number of photons absorbed by the photo diode. Photons incident upon various pixel circuits are pictorially indicated by 108.

The spectral content of electromagnetic radiation focused onto a focal plane depends upon, among other things, the imaged subject, the illumination of the subject, the transmission characteristics of the propagation path between the imaged subject and optical system 102, the materials used in optical system 102, as well the geometric shape and size of optical system 102. For consumer imaging systems, the spectral range of interest is the visible region of the electromagnetic spectrum.

The CFA is an array of filters, usually contiguous and deposited over pixel sensor array 106 so that each pixel sensor is substantially sensitive to only the electromagnetic radiation passed by one filter. (A filter in the CFA may actually be a composite filter manufactured from two or more filters, so that the transfer function of the resulting filter is the product of the transfer functions of its constituent filters.) Each filter in the CFA passes electromagnetic radiation within some spectral range. For example, a CFA may be composed of red, green, and blue filters, so that the pixel sensors may provide signals indicative of the visible color spectrum.

If there is not an infrared blocking element somewhere in the optical chain, then infrared radiation (IR), typically considered to be light with a wavelength longer than 780 nm, may also be focused upon the focal plane. Imaging sensors or devices based on silicon technology typically require the use of infrared blocking elements to prevent IR from entering the imaging array. Silicon-based devices will typically be sensitive to light with wavelengths up to approximately 1200 nm. If the IR is permitted to enter the array, the device will respond to the IR, and generate an output image signal. Since the purpose of an imaging system (in this context) is to create a representation of the visible light present in a scene, the IR may introduce a false response and distort the image. In a monochrome (black and white) imaging system, the result may be an obviously distorted rendition. For example, foliage and human skin tones may appear unusually light. In a color imaging system, the introduction of IR may distort the coloration and produce an image with incorrect and de-saturated color.

A common method for preventing these difficulties is to use ionically colored glass or a thin-film optical coating on glass to create an optical element which passes visible light (typically from 380 nm to 780 nm) and blocks the IR. This element can be placed in front of the taking lens, located within the lens system, or it can be incorporated into the imager package. The principle disadvantages to this approach are cost and added system complexity.

An alternative approach is to allow IR to enter the focal plane, and then remove the IR signal electronically. In this approach, the CFA will have some IR pass filters (which also substantially block visible light), and the pixel sensor array would have some pixel sensors responsive to IR only. The effect of IR upon an image signal is substantially reduced by electronically subtracting signals generated by IR pixel sensors from signals generated by pixel sensors responsive to both IR and visible light.

It is therefore desirable to provide for a CFA with a suitable arrangement of IR and visible color filters, and to provide for a method of processing the resulting pixel signals to obtain proper color interpolation without the need of an IR blocking filter.

BRIEF DESCRIPTION OF THE DRAWINGS

FIG. 6 is a unit array of a four color mosaic pattern.

FIG. 8 is a unit array of a four color mosaic pattern for the CMY color space.

DETAILED DESCRIPTION OF EMBODIMENTS

Figures 1, 2:
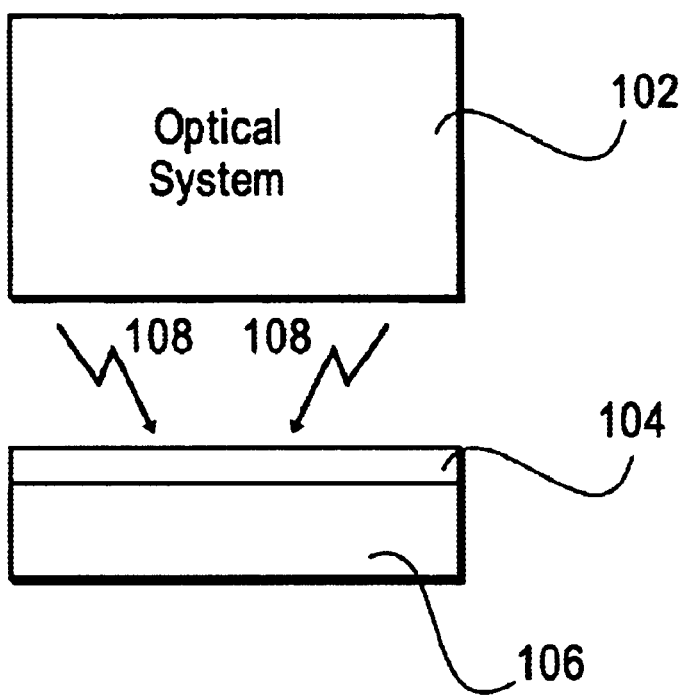
FIG. 1 illustrates a simplified cross sectional view of an imaging system.
FIG. 2 is a unit array of a four color mosaic pattern for the RGB color space.

A four color Red-Green-Blue-InfraRed (R-G-B-IR) tiling pattern for a CFA is described in which the ratio of green, red, blue, and IR filters is approximately 4:1:1:2. (It may be approximate due to "edge" effects in the deposition of the CFA.) FIG. 2 illustrates a unit array of a tiling pattern according to an embodiment of the present invention, where R, G, B, and IR, denote red, green, blue, and IR pass filters, respectively. The tiling pattern is provided by repeating the unit array of FIG. 2 in both the row and column directions. The number of repetitions may be non-integral. For convenience, we shall refer to IR as a color, so that the tiling pattern based upon the unit array of FIG. 2 is a four-color mosaic pattern. It is also to be understood that the R, G, and B pass filters may also each pass IR.

It is to be appreciated that the designations of rows and columns is arbitrary, and that the pattern of filters in FIG. 2 may be rotated about a perpendicular to the figure. For notational simplicity, we shall denote a pixel sensor as red, green, blue, or IR, if it is responsive to substantially only electromagnetic radiation passed by a red, green, blue, or IR pass filter, respectively.

Figure 3:
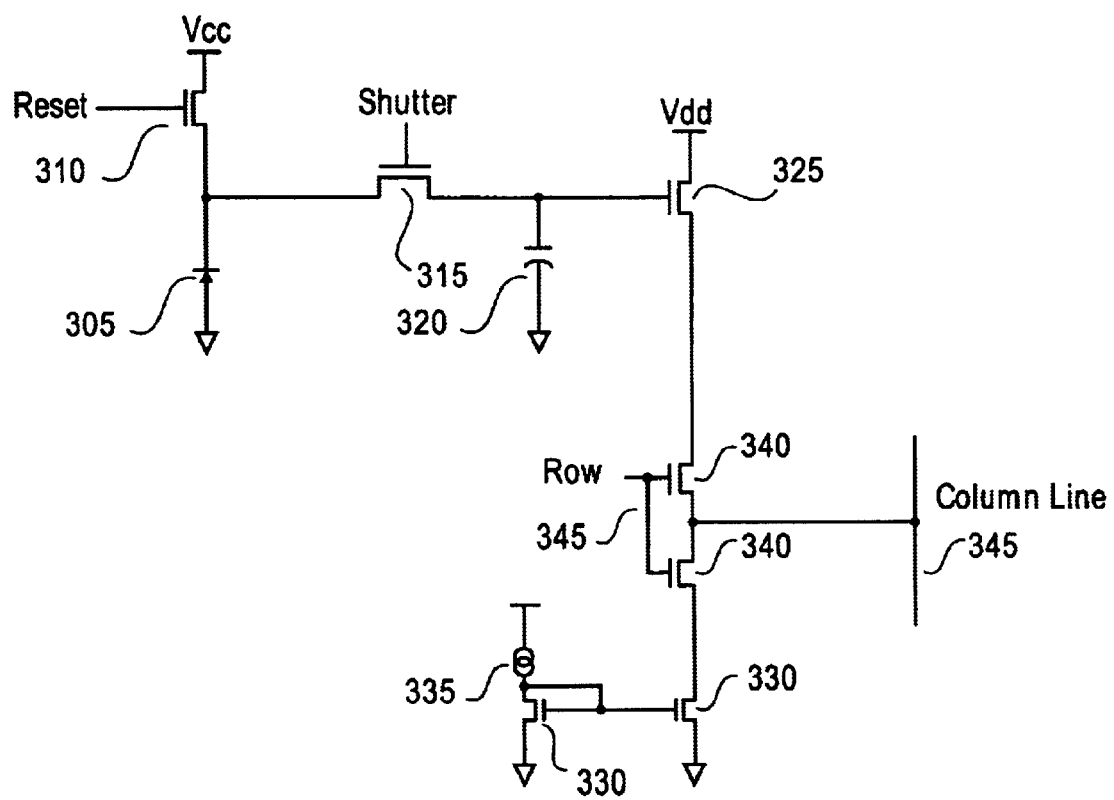
FIG. 3 is a circuit diagram of a pixel sensor.

Let X(n,m) denote the output signal of a pixel sensor responsive to the pass filter of row-column position (n,m). The output signal may, for example, be a voltage or a current. An embodiment of a pixel sensor circuit in which the output signal is a voltage is shown in FIG. 3, where the pixel sensor circuit comprises pixel diode 305 and associated circuitry. Photons captured by diode 305 are measured in the following way. A reset voltage signal goes HIGH to switch nMOSFET 310 ON so that diode 305 is reverse biased to a reverse bias voltage $V_{cc}$. This creates a wide depletion layer within diode 305. While reset voltage signal is HIGH, a shutter voltage signal also is set HIGH to switch nMOSFET 315 ON so that capacitor 320 is charged to the reverse bias voltage of diode 305. When diode 305 is impacted by a photon with sufficient energy, the photon generates an electron-hole pair. If the reset voltage signal is brought LOW so that nMOSFET 310 is OFF but the shutter voltage signal is still HIGH, then electron-hole pairs generated by photons captured in diode 305 discharge diode's 305 parasitic capacitance, reducing diode's 305 reverse bias voltage and similarly reducing the voltage stored on capacitor 320. The length of time for which the shutter voltage signal is HIGH and the reset voltage signal is LOW determines the integration time. In one embodiment, diode 305 is initially biased to approximately 2.3 volts.

Figure 4:
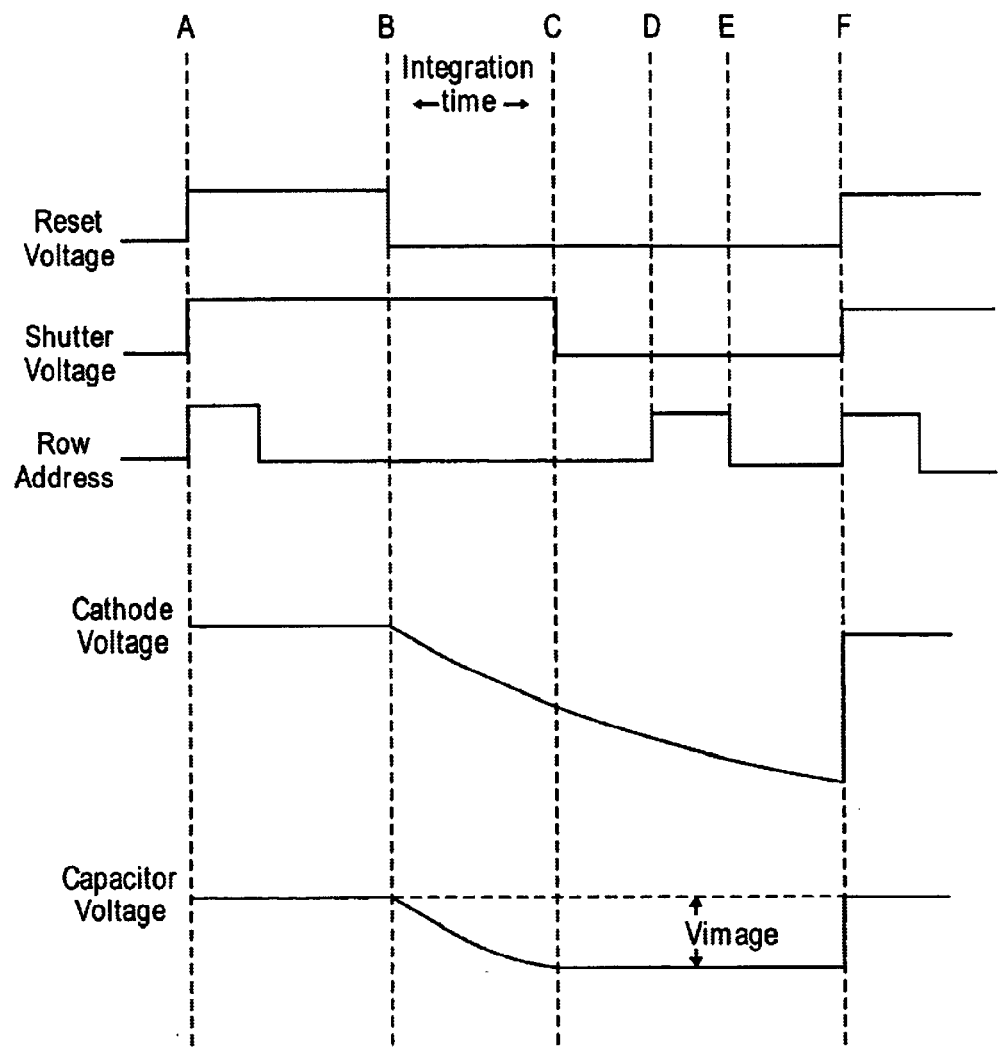
FIG. 4 is a signal timing diagram for the pixel sensor circuit of FIG. 3.

FIG. 4 illustrates various signals related to FIG. 3. In FIG. 4, the reset and shutter voltage signals are HIGH during time segment A-B, whereas the reset voltage signal is OFF during time segment B-C but the shutter voltage signal is HIGH. Time segment B-C represents the integration time. During the integration time, the voltage at the cathode of diode 305 and the voltage of capacitor 320 are decaying due to the generation of electron-hole pairs. After the shutter voltage signal goes LOW at time C, the cathode voltage of diode 305 continues to decay, but the voltage of capacitor 320 stays approximately constant. The voltage difference denoted by $V_{image}$ in FIG. 4, which is the difference between the initial and final voltages of capacitor 320, represents the time integration of the intensity of light captured by pixel diode 305 during a frame time.

To determine $V_{image}$, the voltage of capacitor 320 needs to be read when diode 305 is fully reverse biased (when the reset voltage signal is HIGH) and when the shutter voltage signal returns LOW. The voltage of capacitor 320 is read at the source of nMOSFET 325, where nMOSFET 325, current mirror nMOSFETs 330, and current source 335 comprise a follower. The source voltage of nMOSFET 325 is read by switching a row address voltage signal HIGH so that nMOSFETs 340 are ON. If column line 345 is properly discharged before the row address voltage signal is HIGH, then the voltage on column line 345 is to within a threshold voltage drop of the voltage of capacitor 320. Not shown in FIG. 3 are other column pixels coupled to column line 345 and identical in structure to that shown in FIG. 3.

The row address voltage signal is shown in FIG. 4. By setting the row address voltage signal HIGH during the time segment A-B, the source voltage of nMOSFET 325 is read when capacitor 320 is fully charged, and by setting the row address voltage signal HIGH during the time segment C-F (but not at time F) the source voltage of nMOSFET 325 is read when capacitor 320 is discharged after the integration time. The former and latter read source voltages provide calibration and sample voltage signals, respectively. If dark voltage was not present, then $V_{image}$ would be an accurate representation of the time integration of the light intensity incident upon pixel diode 305. Subtracting the sample voltage signal from the calibration voltage signal compensates for pixel-to-pixel variation, such as differences in threshold voltages for the source follower transistors (nMOSFET 325).

FIG. 3 is only one representative example of a pixel sensor. The output signals from the pixel sensors are processed to obtain interpolated red, green, and blue color component signals. Let R(n,m), G(n,m), and B(n,m) denote, respectively, interpolated red, green, and blue color component signals for row-column position (n,m).

A method for providing the interpolated color component signals for the tiling pattern of FIG. 2 can be concisely described by introducing the notation that an index i for which i=1, 2, or 3, denotes, respectively, red, blue, or green. As an example of this notation, let $\hat{X}_1$ (n,m) denote an interpolated color component signal, where $\hat{X}_1$ (n,m)=R(n,m), $\hat{X}_2$ (n,m)=G(n,m), and $\hat{X}_3$ (n,m)=B(n,m). A method for providing the interpolated color component signals for the tiling pattern of FIG. 2 is now described as follows: For a position (n,m), pixel sensor output signal X(n,m), and for each i=1, 2, 3, if X(n,m) is an output signal of a color i pixel sensor, then $\hat{X}_i$ (n,m)=X(n,m), and if X(n,m) is an output signal of an IR pixel sensor or a color j≠i pixel sensor, then $\hat{X}_i$ (n,m) is an average of the output signals of nearest neighbor color i pixel sensors.

Figure 5:
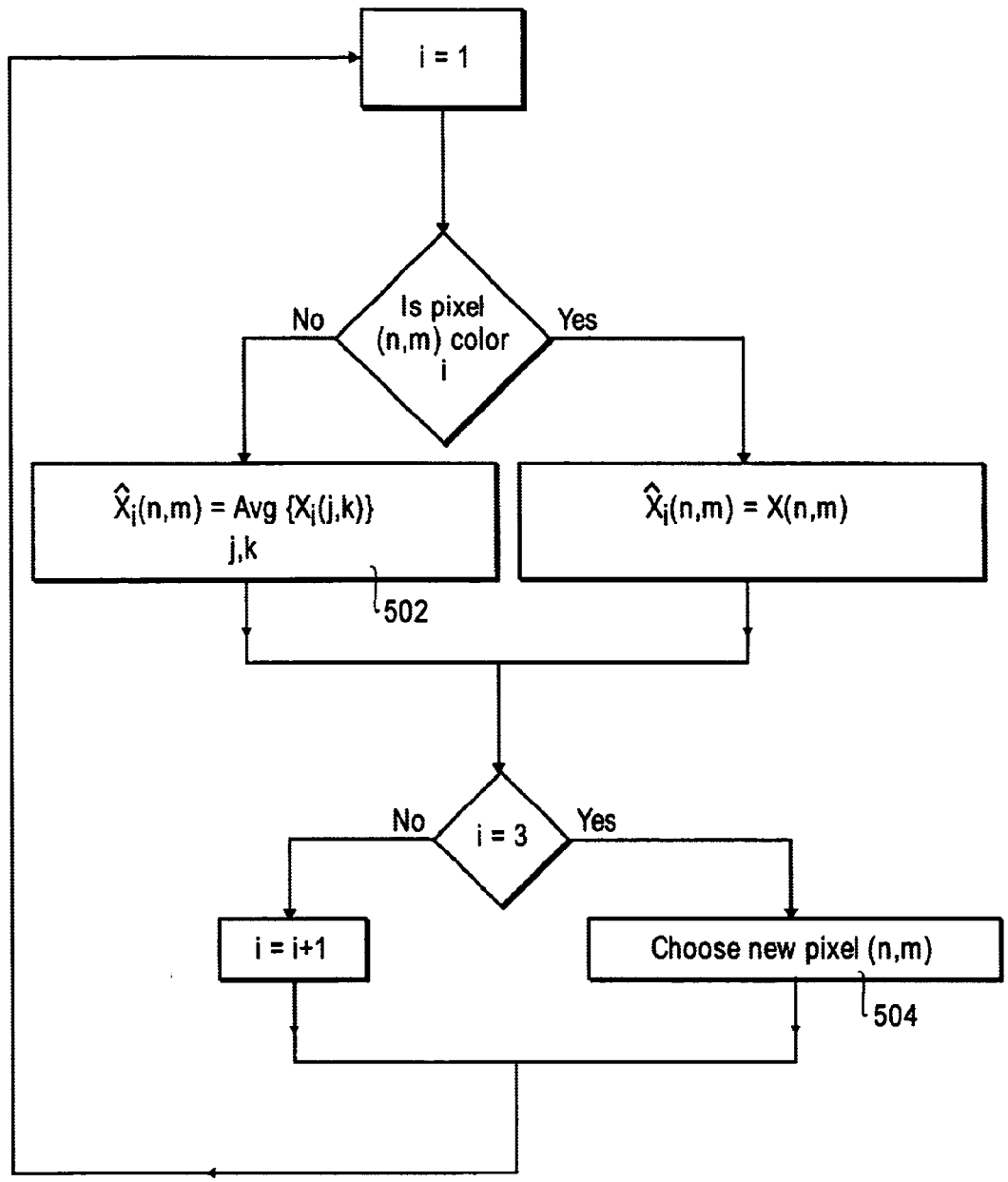
FIG. 5 is a flow diagram for color component signal interpolation.
Figure 6:
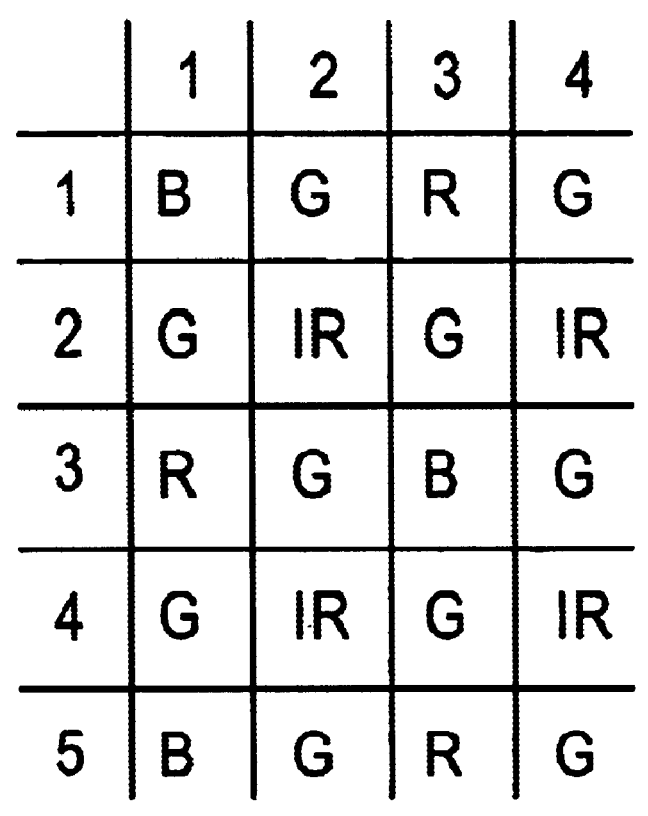

FIG. 5 provides a flow diagram of the above method. In step 502, the averaging is understood to be over nearest neighbor pixel sensor positions having color i. To illustrate examples, refer to FIG. 6, which is the tiling pattern of FIG. 2 extended to have five rows. The rows and columns in FIG. 6 are indexed as shown for convenience only. As an example of nearest neighbor averaging, consider position (2,2) in FIG. 6. This is an IR pass filter. A set of interpolated color signal components is:

$$R(2,2) = \frac{X(1,3) + X(3,1)}{2},$$

$$G(2,2) = \frac{X(1,2) + X(2,1) + X(3,2) + X(2,3)}{4},$$

$$B(2,2) = \frac{X(1,1) + X(3,3)}{2}.$$

As another example, consider position (3,3) in FIG. 6. This is a blue pass filter. A set of lo interpolated color signal components is:

$$R(3,3) = \frac{X(1,3) + X(5,3)}{2},$$

$$G(3,3) = \frac{X(2,3) + X(3,2) + X(3,4) + X(4,3)}{4},$$

$$B(3,3) = X(3,3).$$

For another example, consider position (3,2) in FIG. 6. This is a green pass filter. A set of interpolated color signal components is:

R(3,2)=X(3,1),
G(3,2)=X(3,2),
B(3,2)=X(3,3).

The above sums and divisions in the above displayed equations are to be interpreted as operations performed in either the analog or digital domain. In general, the averaging of signals over nearest neighbors is approximate because of finite wordlengths, if performed in the digital domain, or the inherent approximate nature of performing operations in the analog domain. Furthermore, the interpolated signals need only be proportional (or approximately) proportional to an average. For example, the right-hand-sides of the above displayed equations may be multiplied by a proportionality factor.

Figure 7:
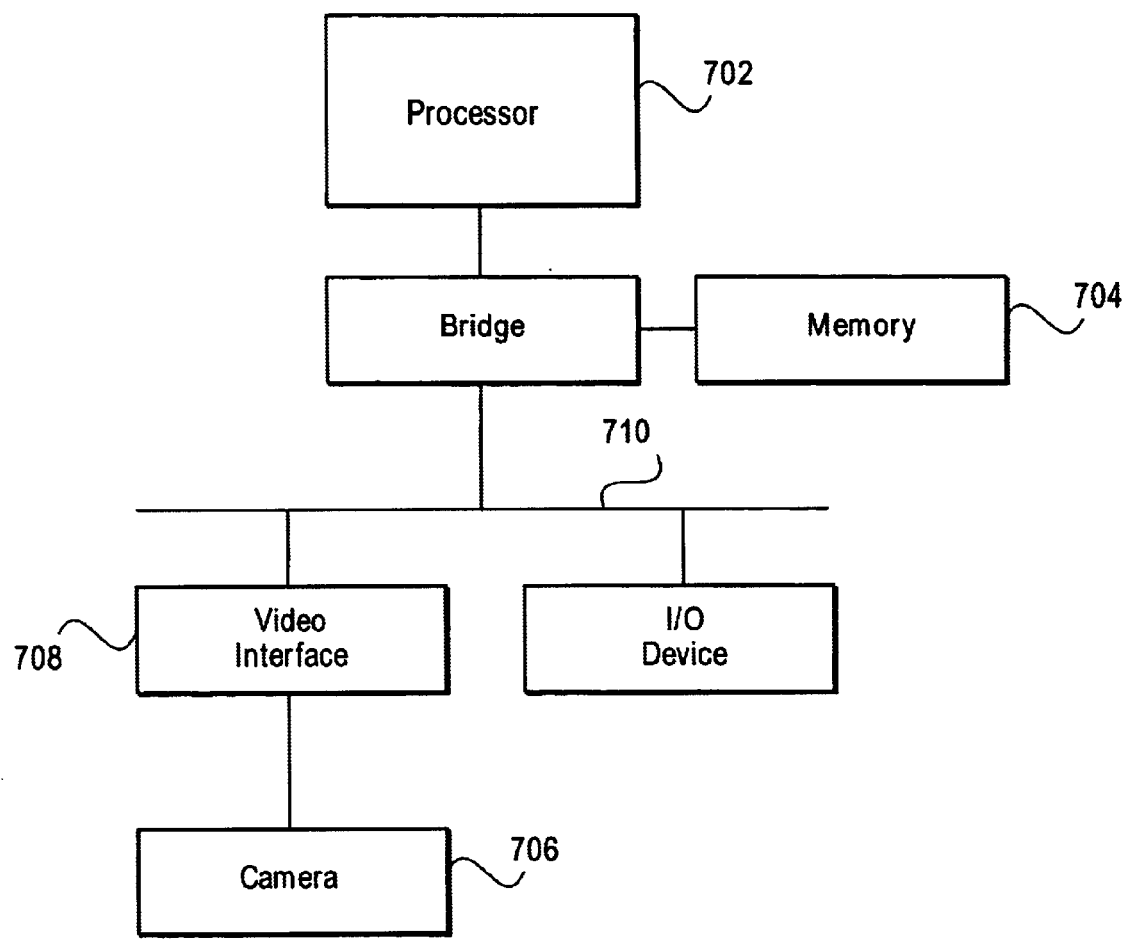
FIG. 7 is a block diagram of a computer system to perform color interpolation.

The averaging operations may be performed by non-programmed hardwired circuits (either analog or digital), by circuits programmed by firmware (software stored in non-volatile memory), by a computer, or any combination of such methods. For example, a simplified computer system is illustrated in FIG. 7. In the embodiment of FIG. 7, processor 702 performs the nearest neighbor averaging indicated in step 502 of FIG. 5, where the software code for performing this averaging is stored in memory 704. In FIG. 7, camera provides image data to processor 702. Video interface circuit 708, which for some embodiments may not be needed, provides for communication between processor 702 and camera 706 via bus 710. As one alternative to the embodiment of FIG. 7, pixel averaging may be performed by circuits within camera 706.

Returning to FIG. 5, in step 504, the indices n and m are changed and new interpolated color component signals are interpolated for a new position (n,m). The processing indicated by FIG. 5 may be performed on the pixel sensor positions in a sequential manner, or more than one position may be processed in parallel.

The output signals from the IR pixel sensors may be used to subtract the IR components from the $\hat{X}_i$ (n, m). For example, an interpolated IR signal component for position (n, m) may be obtained by taking the average of the output signals from the nearest IR pixel sensors, and subtracting this interpolated IR signal from the interpolated color component signals. For some embodiments, this processing may be performed by processor 702.

Figure 8:
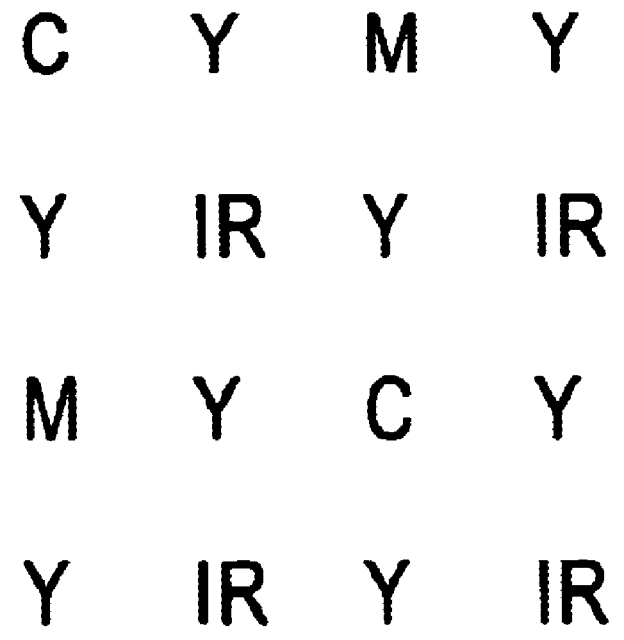

The IR pass filters may be manufactured using commercial Color Filter Array (CFA) materials, taking advantage of the fact that these materials are transparent to IR radiation. By a simple overlay of two CFA colors (e.g., R and B pass filters) that have no overlapping transmittance in the visible portion of the spectrum, it is possible to create a composite filter element that blocks the visible light and transmits only IR. If two filters are used to form the composite filter, then each of the two filters has a visible radiation pass spectrum that is disjoint from the other, so that there is substantially no transmittance of visible light through the resulting composite filter formed from the combination of the two filters. If more than two filters are used, then each filter has a visible radiation pass spectrum such that the resulting composite filter is substantially opaque to visible light. This composite filter element is thus an IR pass filter, because each of the component filters used to form the composite filter is substantially transparent to IR Another embodiment of the present invention for the CMY (Cyan-Magenta-Yellow) color space is provided in FIG. 8. FIG. 8 denotes a unit array of filters for a tiling pattern where filters designated by C, Y, and M denote pass filters for the colors cyan, yellow, and magenta, respectively. Note that the unit array of FIG. 8 corresponds to the unit array of FIG. 2 by making the correspondences: C⇌B, Y⇌G, and M⇌R.

FIG. 5 provides a flow diagram for pixel interpolation with the CMY tiling pattern of FIG. 8, where now M(n,m), Y(n,m), and C(n,m) denote, respectively, interpolated magenta, yellow, and cyan color component signals for row-column position (n,m), and now $\hat{X}_i$ (n,m) denotes an interpolated color component signal where $\hat{X}_1$ (n,m)=M(n, m), $\hat{X}_2$ (n,m)=Y(n,m), and $\hat{X}_3$ (n,m)=C(n,m).

It is to be understood that in some embodiments, not all interpolated color component signals need be obtained by averaging signals from nearest neighbors with like colors. For example, signals from pixel sensors at the edge of the CFA may be processed differently. Or, only a proper subset of the signal outputs from the pixel sensors may be interpolated. Many modifications may be made to the above disclosed embodiments, and the invention is limited only by the scope of the claims below.

What is claimed is:

1. A color filter array comprising:

a first row of pass filter, comprising, in order, blue, green, red, and green pass filters;

a second row of pass filters, comprising, in order, green, infrared, green, and infrared pass filters, wherein the second row of pass filters is adjacent to the first row of pass filters so that the blue pass filter of the first row is adjacent to the first green pass filter of the second row;

a third row of pass filters, comprising, in order, red, green, blue, and green pass filter, wherein the first green pass filter of the second row is adjacent to the red pass filter of the third row; and a fourth row of pass filters, comprising, in order, green, infrared, green, and infrared pass filters, wherein the red pass filter of the third row is adjacent to the first green pass filter of the fourth row.

2. A color filter array comprising an array of pass filters $f_{ij}$ where subscripts on f denote row-column position, wherein for some indices n and m:

$f_{n+1,m+1}$ and $f_{n+3,m+3}$ are blue pass filters;

$f_{n+1,m+2}, f_{n+1,m+4}, f_{n+2,m+1}, f_{n+2,m+3}, f_{n+3,m+2}, f_{n+3,m+4}, f_{n+4,m+1}$, and $f_{n+4,m+3}$ are green pass filters;

$f_{n+1,m+3}$ and $f_{n+3,m+1}$ are red pass filters; and $f_{n+2,m+2}, f_{n+2,m+4}, f_{n+4,m+2}$, and $f_{n+4,m+4}$ are infrared pass filters.

3. An imaging system comprising:

a color filter array comprising an array of pass filters f, where subscripts on f denote row-column position, wherein for some indices n and m:

$f_{n+1,m+1}$ and $f_{n+3,m+3}$ are blue pass filters;

$f_{n+1,m+2}, f_{n+1,m+4}, f_{n+2,m+1}, f_{n+2,m+3}, f_{n+3,m+2}, f_{n+3,m+4}, f_{n+4,m+1}$, and $f_{n+4,m+3}$ are green pass filters;

$f_{n+1,m+3}$ and $f_{n+3,m+1}$ are red pass filters;

$f_{n+2,m+2}, f_{n+2,m+4}, f_{n+4,m+2}$, and $f_{n+4,m+4}$ are infrared pass filters; and an array of pixel sensors responsive to electromagnetic radiation propagating through the color filter array, wherein for some range of position indices u and v, a pixel sensor at position (u,v) provides an output signal X(u,v) indicative of electromagnetic radiation propagating through the color filter array and impinging upon the pixel sensor at position (u,v).

4. The imaging system as set forth in claim 3, further comprising at least one processor to provide interpolated color component signals $\hat{X}_i(u,v)$, i=1, 2, 3, where i=1 denotes red, i=2 denotes green, and i=3 denotes blue, wherein for each i=1, 2, 3; if X(u,v) is an output signal of a color i pixel sensor, then $\hat{X}_i(u,v)$=X(u,v), and if X(u,v) is an output signal of an IR pixel sensor or a color j pixel sensor where j=1 denotes red, j=2 denotes green, and j=3 denotes blue such that j≠i, then $\hat{X}_i(u,v)$ is an average of the output signals of nearest neighbor color i pixel sensors.

5. The imaging system as set forth in claim 3, further comprising a memory storage device, wherein stored in the memory storage device are instructions to process interpolated color component signals $\hat{X}_i(u,v)$, i=1, 2, 3, where i=1 denotes red, i=2 denotes green, and i=3 denotes blue, wherein for each i=1, 2, 3; if X(u,v) is an output signal of a color i pixel sensor, then $\hat{X}_1(u,v)=X(u,v)$, and if X(u, v) is an output signal of an IR pixel sensor or a color j pixel sensor where j=1 denotes red, j=2 denotes green, and j=3 denotes blue such that j≠i, then $\hat{X}i(u,v)$ is an average of the output signals of nearest neighbor color i pixel sensors.

6. A method to interpolate color component signals, comprising:

providing a color filter array comprising a first row of pass filters, comprising, in order, blue, green, red, and green pass filters;

a second row of pass filters, comprising, in order, green, infrared, green, and infrared pass filters, wherein the second row of pass filters is adjacent to the first row of pass filters so that the blue paws filter of the first row is adjacent to the first green pass filter of the second row;

a third row of pass filters, comprising, in order, red, green, blue, and green pass filters, wherein the first green pass filter of the second row is adjacent to the red pass filter of the third row; and a fourth row of pass filters, comprising, in order, green, infrared, green and infrared pass filters, wherein the red pass filter of the third row is adjacent to the first green pass filter of the fourth row;

providing an array of pixel sensors responsive to electromagnetic radiation propagating through the color filter array, wherein for some range of position indices u and v, a pixel sensor at position (u,v) provides an output signal X(u,v) indicative of electromagnetic radiation propagating through the color filter array and impinging upon the pixel sensor at position (u,v); and interpolating to provide interpolated color component signals $\hat{X}_i(u,v)$, i=1, 2, 3, where i=1 denotes red, i=2 denotes green, and i=3 denotes blue, wherein for each i=1, 2, 3; if X(u, v) is an output signal of a color i pixel sensor, then $\hat{X}_i(u,v)=X(u,v)$, and if X(u, v) is an output signal of an IR pixel sensor or a color j pixel sensor where j=1 denotes red, j=2 denotes green, and j=3 denotes blue such that j≠i, then $\hat{X}_i(u,v)$ is an average of the output signals of nearest neighbor color i pixel sensors.

7. A method to interpolate color component signals, comprising:

providing a color filter array comprising a color filter array comprising an array of pass filters f, where subscripts on f denote row-column position, wherein for some indices n and m:

$f_{n+1,m+1}$ and $f_{n+3,m+3}$ are blue pass filters;

$f_{n+1,m+2}, f_{n+1,m+4}, f_{n+2,m+1}, f_{n+2,m+3}, f_{n+3,m+2}, f_{n+3,m+4}, f_{n+4,m+1}$, and $f_{n+4,m+3}$ are green pass filters;

$f_{n+1,m+3}$ and $f_{n+3,m+1}$ are red pass filters; and $f_{n+2,m+2}, f_{n+2,m+4}, f_{n+4,m+2}$, and $f_{n+4,m+4}$ are infrared pass filters;

providing an array of pixel sensors responsive to electromagnetic radiation propagating through the color filter array, wherein for some range of position indices u and v, a pixel sensor at position (u,v) provides an output signal X(u,v) indicative of electromagnetic radiation propagating through the color filer array and impinging upon the pixel sensor at position (u,v); and interpolating to provide interpolated color component signals $\hat{X}_i(u,v)$, i=1, 2, 3, where i=1 denotes red, i=2 denotes green, and i=3 denotes blue, wherein for each i=1, 2, 3; if X(u, v) is an output signal of a color i pixel sensor, then $\hat{X}_i(u,v)=X(u,v)$, and if X(u, v) is an output signal of an IR pixel sensor or a color j pixel sensor where j=1 denotes red, j=2 denotes green, and j=3 denotes blue such that j≠i, then $\hat{X}_i(u,v)$ is an average of the output signals of nearest neighbor color i pixel sensors.

8. A color filter array comprising:

a first row of pass filters, comprising, in order, cyan, yellow, magenta, and yellow pass filters;

a second row of pass filters, comprising, in order, yellow, infrared, yellow, and infrared pass filters, wherein the second row of pass filters is adjacent to the first row of pass filters so that the cyan pass filter of the first row is adjacent to the first yellow pass filter of the second row;

a third row of pass filters, comprising, in order, magenta, yellow, cyan, and yellow pass filters, wherein the first yellow pass filter of the second row is adjacent to the magenta pass filter of the third row; and a fourth row of pass filters, comprising, in order, yellow, infrared, yellow, and infrared pass filters, wherein the magenta pass filter of the third row is adjacent to the first yellow pass filter of the fourth row.

9. A color filter array comprising an array of pass filters $f_{ij}$, where subscriptions on f denoted row-column position, wherein for some indices n and m:

$f_{n+1,m+1}$ and $f_{n+3,m+3}$ are cyan pass filters;

$f_{n+1,m+2}, f_{n+1,m+4}, f_{n+2,m+1}, f_{n+2,m+3}, f_{n+3,m+2}, f_{n+3,m+4}, f_{n+4,m+1}$, and $f_{n+4,m+3}$ are yellow pass filters;

$f_{n+1,m+3}$ and $f_{n+3,m+1}$ are magenta pass filters; and $f_{n+2,m+2}, f_{n+2,m+4}, f_{n+4,m+2}$, and $f_{n+4,m+4}$ are infrared pass filters.

10. An imaging system comprising a color filter array comprising an array of pass filters f, where subscripts on f denote row-column position, wherein for some indices n and m:

$f_{n+1,m+1}$ and $f_{n+3,m+3}$ are cyan pass filters;

$f_{n+1,m+2}, f_{n+1,m+4}, f_{n+2,m+1}, f_{n+2,m+3}, f_{n+3,m+2}, f_{n+3,m+4}, f_{n+4,m+1}$, and $f_{n+4,m+3}$ are yellow pass filters;

$f_{n+1,m+3}$ and $f_{n+3,m+1}$ are magenta pass filters;

$f_{n+2,m+2}, f_{n+2,m+4}, f_{n+4,m+2}$, and $f_{n+4,m+4}$ are infrared pass filters; and an array of pixel sensors responsive to electromagnetic radiation propagating through the color filter array, wherein for some range of position indices u and v, a pixel sensor at position (u,v) provides an output signal X(u,v) indicative of electromagnetic radiation propagating through the color filter array and impinging upon the pixel sensor at position (u,v).

11. The imaging system as set forth in claim 10, further comprising at least one processor to provide interpolated color component signals $\hat{X}_i(u,v)$, i=1, 2, 3, where i=1 denotes magenta, i=2 denotes yellow, and i=3 denotes cyan, wherein for each i=1, 2, 3; if X(u,v) is an output signal of a color i pixel sensor, then $\hat{X}_i(u,v)=X(u,v)$, and if X(u,v) is an output signal of an IR pixel sensor or a color j pixel sensor where j=1 denotes magenta, j=2 denotes yellow, and j=3 denotes cyan such that j≠i, then $\hat{X}_i(u,v)$ is an average of the output signals of nearest neighbor color i pixel sensors.

12. The imaging system as set forth in claim 10, further comprising a memory storage device, wherein stored in the memory storage device are instructions to process interpolated color component signals $\hat{X}_i(u,v)$, i=1, 2, 3, where i=1 denotes magenta, i=2 denotes yellow, and i=3 denotes cyan, wherein for each i=1, 2, 3; if $X(u,v)$ is an output signal of a color i pixel sensor, then $\hat{X}_i(u,v)=X(u,v)$, and if $X(u, v)$ is an output signal of an IR pixel sensor or a color j pixel sensor where j=1 denotes magenta, j=2 denotes yellow, and j=3 denotes cyan such that j≠i, then $\hat{X}_i(u,v)$ is an average of the output signals of nearest neighbor color i pixel sensors.

13. A method to interpolate color component signals, comprising:

providing a color filter array comprising a first row of pass filters, comprising, in order, cyan, yellow, magenta, and yellow pass filters;

a second row of pass filters, comprising, in order, yellow, infrared, yellow, and infrared pass filters, wherein the second row of pass filters is adjacent to the first row of pass filters so that the cyan pass filter of the first row is adjacent to the first yellow pass filter of the second row;

a third row of pass filters, comprising, in order, magenta, yellow, cyan, and yellow pass filters, wherein the first yellow pass filter of the second row is adjacent to the magenta pass filter of the third row; and a fourth row of pass filters, comprising, in order, yellow, infrared, yellow, and infrared pass filters, wherein the magenta pass filter of the third row is adjacent to the first yellow pass filter of the fourth row;

providing an array of pixel sensors responsive to electromagnetic radiation propagating through the color filter array, wherein for some range of position indices u and v, a pixel sensor at position (u,v) provides an output signal $X(u,v)$ indicative of electromagnetic radiation propagating through the color filter array and impinging upon the pixel sensor at position (u,v); and interpolating to provide interpolated color component signals $\hat{X}_i(u,v)$, i=1, 2, 3, where i=1 denotes magenta, i=2 denotes yellow, and i=3 denotes cyan, wherein for each i=1, 2, 3; if $X(u,v)$ is an output signal of a color i pixel sensor, then $\hat{X}_i(u,v)=X(u,v)$, and if $X(u, v)$ is an output signal of an IR pixel sensor or a color j pixel sensor where j=1 denotes magenta, j=2 denotes yellow, and j=3 denotes cyan such that j≠i, then $\hat{X}_i(u,v)$ is an average of the output signals of nearest neighbor color i pixel sensors.

14. A method to interpolate color component signals, comprising:

providing a color filter array comprising a color filter array comprising an array of pass filters f, where subscripts on f denote row-column position, wherein for some indices n and m:

$f_{n+1,m+1}$ and $f_{n+3,m+3}$ are cyan pass filters;

$f_{n+1,m+2}, f_{n+1,m+4}, f_{n+2,m+1}, f_{n+2,m+3}, f_{n+3,m+2}, f_{n+3,m+4}, f_{n+4,m+1}$, and $f_{n+4,m+3}$ are yellow pass filters;

$f_{n+1,m+3}$ and $f_{n+3,m+1}$ are magenta pass filters;

$f_{n+2,m+2}, f_{n+2,m+4}, f_{n+4,m+2}$, and $f_{n+4,m+4}$ are infrared pass filters; and providing an array of pixel sensors responsive to electromagnetic radiation propagating through the color filter array, wherein for some range of position indices u and v, a pixel sensor at position (u,v) provides an output signal $X(u,v)$ indicative of electromagnetic radiation propagating through the color filter array and impinging upon the pixel sensor at position (u, v); and interpolating to provide interpolated color component signals $\hat{X}_i(u,v)$, i=1, 2, 3, where i=1 denotes magenta, i=2 denotes yellow, and i=3 denotes cyan, wherein for each i=1, 2, 3; if $X(u,v)$ is an output signal of a color i pixel sensor, then $\hat{X}_i(u,v)=X(u,v)$, and if $X(u, v)$ is an output signal of an IR pixel sensor or a color j pixel sensor where j=1 denotes magenta, j=2 denotes yellow, and j=3 denotes cyan such that j≠i, then $\hat{X}_i(u,v)$ is an average of the output signals of nearest neighbor color i pixel sensors.

\* \* \* \* \*

UNITED STATES PATENT AND TRADEMARK OFFICE
CERTIFICATE OF CORRECTION

PATENT NO. : 6,759,646 B1
DATED : July 6, 2004
INVENTOR(S) : Acharya et al.

It is certified that error appears in the above-identified patent and that said Letters Patent is hereby corrected as shown below:

Column 4,
Line 14, delete "$\hat{X}_1$" and insert -- $\hat{X}_i$ --.

Line 44, delete "lo".

Column 6,
Line 59, delete "$\hat{X}_1$" and insert -- $\hat{X}_i$ --.

Column 7,
Line 22, delete "paws" and insert -- pass --.

Column 8,
Line 1, delete "filer" and insert -- filter --.
Line 30, delete "subscriptions" and insert -- subscripts --.

Signed and Sealed this

Sixteenth Day of November, 2004

JON W. DUDAS
*Director of the United States Patent and Trademark Office*